(12) United States Patent
Ziklik

(10) Patent No.: US 8,195,137 B2
(45) Date of Patent: Jun. 5, 2012

(54) UPDATING CONTACT INFORMATION FOR MOBILE TRAFFIC

(75) Inventor: Elad Ziklik, Modiin (IL)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 12/118,311

(22) Filed: May 9, 2008

(65) Prior Publication Data

US 2009/0280786 A1 Nov. 12, 2009

(51) Int. Cl.
*H04M 3/42* (2006.01)

(52) U.S. Cl. ... 455/415; 455/418; 455/417; 379/142.01; 379/142.02; 379/142.03; 379/142.05; 379/142.06; 709/142.07; 709/142.08; 709/142.09; 709/142.1

(58) Field of Classification Search ............ 455/415, 455/417, 418; 379/142.01, 142.02, 142.03, 379/142.04, 142.05, 142.06, 142.07, 142.08, 379/142.09, 142.1; 709/217; 370/352
See application file for complete search history.

(56) References Cited

U.S. PATENT DOCUMENTS

| | | | |
|---|---|---|---|
| 6,564,264 B1 | 5/2003 | Creswell et al. | |
| 6,687,362 B1 | 2/2004 | Lindquist et al. | |
| 6,870,915 B2 | 3/2005 | Stillman et al. | |
| 7,228,335 B2 | 6/2007 | Caughey | |
| 2006/0005020 A1* | 1/2006 | Hardt | 713/166 |
| 2006/0229063 A1 | 10/2006 | Koch | |
| 2007/0010264 A1 | 1/2007 | Sun et al. | |
| 2007/0038720 A1 | 2/2007 | Reding et al. | |
| 2007/0106698 A1 | 5/2007 | Elliott et al. | |
| 2007/0130135 A1 | 6/2007 | Hagiuda | |
| 2007/0223683 A1 | 9/2007 | Pearson | |

OTHER PUBLICATIONS

Network Address Book http://www.voxmobili.com/jsp/products/products_1_1.jsp.
Openwave® Network Address Book http://www.openwave.com/us/products/messaging_products/network_address_book/.

* cited by examiner

*Primary Examiner* — Patrick Edouard
*Assistant Examiner* — Fred Casca
(74) *Attorney, Agent, or Firm* — Vierra Magen Marcus & DeNiro LLP

(57) ABSTRACT

A system for managing contact information between mobile devices. A notification is received any time a mobile device initiates or terminates a communication. The receiving mobile device is prompted to obtain the contact information of the caller. Based on permissions set by the caller, the receiving mobile device may obtain the caller's public contact information, private contact information, none of the caller's contact information or some combination of the caller's public and private contact information. In one embodiment, a subset of the caller's contact information is displayed in the screen of a receiving mobile device coincidentally while receiving the phone call to provide a caller-identification feature.

9 Claims, 11 Drawing Sheets

UPDATING CONTACT INFORMATION FOR MOBILE TRAFFIC

BACKGROUND

When a user receives a phone call today, the phone network sometimes provides a caller-identification (caller ID); that is, the phone number of the party that is calling. Sometimes, the telephone network also sends a short name if it finds the short name in a directory managed by the network. This helps the receiver make a decision about whether to answer the call and if so, how to prepare for the call. Unfortunately, a caller ID system has a number of problems. Caller ID information is not always available. When the caller ID information is unavailable, the receiver usually sees the message "Unknown" or something similar.

Additionally, caller ID does not provide very rich information. In most cases, the information provided is just the phone number. In some cases, it is just the number and a short name. Some mobile devices solve part of this problem by matching the number to a contact card that is stored on the phone. However, matching the number to a stored contact only works if the user has previously stored this information in a contact entry on the mobile device receiving the call.

SUMMARY

One aspect of the present technology is to manage contact information between users. A system receives notification that a signal between a calling mobile device and a receiving mobile device has terminated. A request is sent to the receiving mobile device prompting whether the person wants to obtain the caller's contact information. If the person requests the caller's contact information, the caller's contact information is obtained from a network address book and the contact information is transmitted to the receiving mobile device.

One aspect of the present technology is to provide a caller-identification feature. A receives notification that a caller initiated a phone call to a receiving mobile device. The caller's contact information, which is stored in a network address book, is identified. The permission level, if any, set by the caller is identified. Based on the permission level, a subset of the caller's contact information is obtained from the caller's network address book. The subset of contact information is then transmitted coincidentally with the phone call to the receiving mobile device. The subset of contact information is displayed in a screen of the receiving mobile device.

One aspect of the present technology is to manage a unified address book. The user's contact information is consolidated into a single unified address book in the system, regardless of the source of the contact information. Other persons' contact information is periodically added to the user's address book as the user communicates with others. The user may also add contact information to the address books from other sources. The present technology periodically synchronizes the network address book with the other address book sources, and synchronizes the network address book with each of the user's mobile devices.

DETAILED DESCRIPTION

The technology described herein is a system for managing contact information between mobile devices. The system prompts the receiving mobile device to obtain contact information associated with the caller. The contact information is transmitted to the receiving mobile device as a virtual card (vCard) or SMS message. The system also displays a subset of the caller's contact information in the screen of the receiving mobile device as a caller-identification feature as if the caller was already stored in the receiving mobile device's address book. Every subscriber of the system controls what contact information, if any, to expose to third parties.

Mobile devices including portable telephone systems, such as cellular phones, have been steadily increasing the type and variety of content that they provide to a user. Many mobile devices incorporate sufficient computing capabilities to fall within the category of the small, handheld computing devices. Mobile devices may be known by other names rather than cellular phones and generally refer to devices that have been integrated with receiver/transmitter technology so that they can send and receive telephone calls or other messages via a network. Mobile devices include palmtops, pocket computers, personal digital assistants, personal organizers, personal computers (PCs), and the like.

Figure 1:
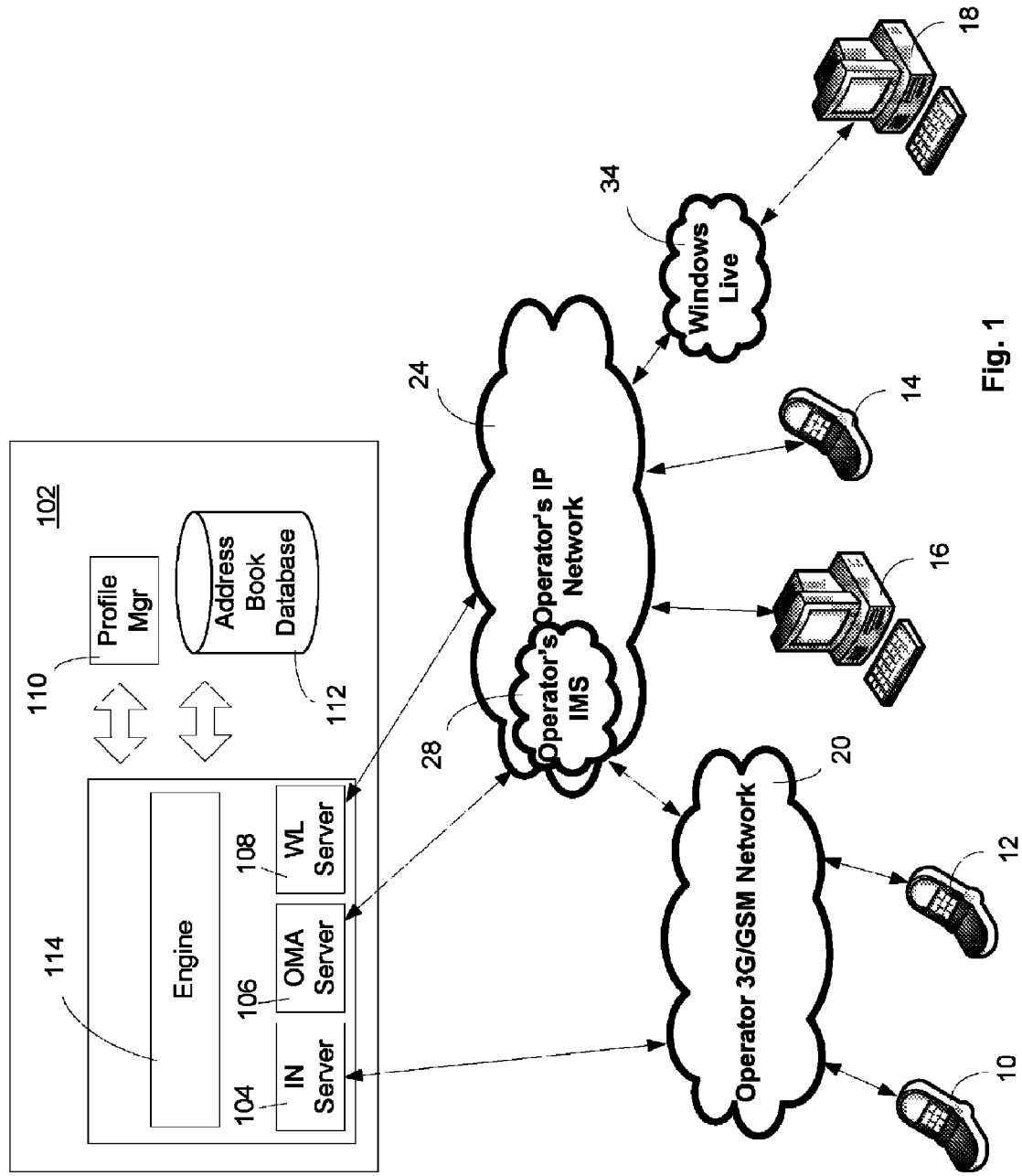
FIG. 1 depicts a block diagram of a system for implementing one embodiment of the present technology.

FIG. 1 illustrates a service provider system 102 that enables telecommunication operators (e.g., Verizon®, AT&T®, etc.) to deliver unified services to both fixed and mobile device users as well as lay the foundation for the next generation Internet protocol multimedia subsystems (IMS) architecture by utilizing existing mobile core network and back office systems. The service provider system 102 is installed as part of the telecommunication operator's core network. The service provider system 102 is expected to operate with various components in the carrier network. FIG. 1 illustrates that the service provider system 102 comprises an interface network (IN) server 104, an OMA server 106, a WINDOWS LIVE (WL) server 108, a profile store 110, an address book database 112 and an engine 114. These components are exemplary and, as described below, the system provider system 102 is not limited to those components shown in FIG. 1.

The service provider system 102 supports different application interfaces allowing networked communications within telecommunication operator's various networks. The telecommunication operator networks include, but are not limited to, a 3G/GSM network 20, internet protocol network 24 and a WINDOWS LIVE cloud 34. The service provider system 102 may also interface directly with the WINDOWS LIVE cloud 34.

The service provider system 102 allows users to access, view and obtain other persons' contact information. Users may connect to the service provider system 102 through any number of networks, including, but not limited to, via a mobile phone on the network 20 (shown as mobile phones 10, 12), via a personal computer on the Internet (shown as personal computer 16 via network 24), via a personal computer through the WINDOWS LIVE cloud 34 or via an IP phone through the network 24 (shown as IP phone 14). FIG. 1 illustrates many different ways users may communicate with each other such as, but not limited to, through the operator's 3G network 20 (by initiating or receiving a call on mobile devices 10, 12), through the operator's IP network 24 (by initiating/receiving a call on mobile device 14 or personal computer 16) or through the WINDOWS LIVE cloud (by receiving/initiating a call on the personal computer 18).

The service provider system 102 include a unified (also referred to as a "consolidated") address book 112 for all registered users. The address book 112 stores contact information (also referred to as "profiles") for each registered user, as explained in greater detail later. The contact information is available to registered users across a variety of user applications such as instant messaging, cellular calls, SMS texting, etc.

Figure 2:
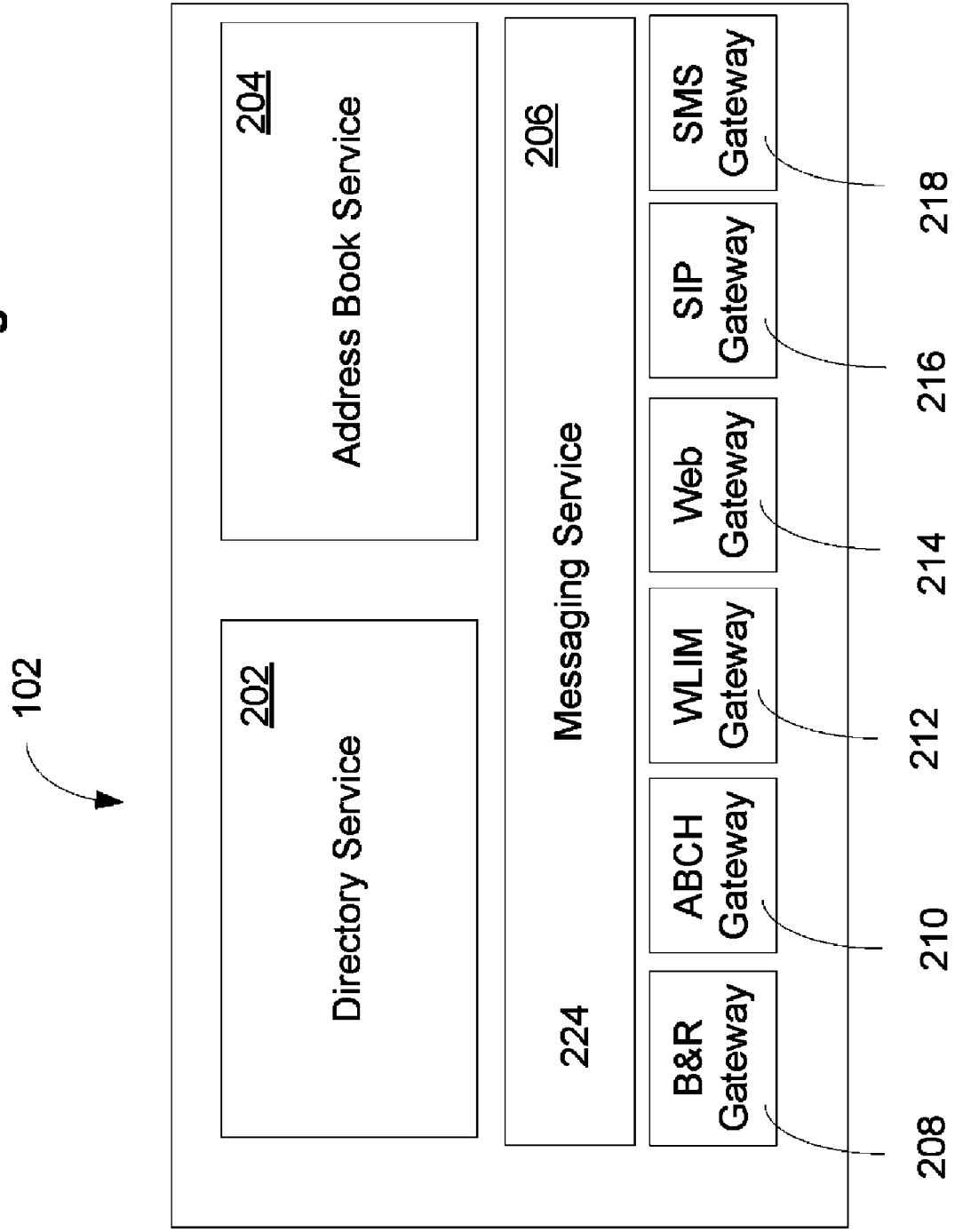
FIG. 2 depicts a block diagram providing additional detail of the system shown in FIG. 1.

FIG. 2 illustrates a more detailed view of the service provider system 102. The service provider system 102 comprises a directory service 202, and address book service 204, a messaging service 206 and various gateways. The gateways shown in FIG. 2 include a backup and restore gateway 208, an address book clearing house (ABCH) gateway 210, a WINDOWS LIVE instant messaging gateway 212, a web gateway 214, an SIP gateway 216 and an SMS gateway 218. These components are exemplary and, as described below, the system provider system 102 is not limited to those components shown in FIG. 2. Each component is described in more detail later.

The SMS Gateway 218 connects the service provider system 102 to the telecommunication carrier's short message service center (SMSC). The service provider system 102 is connected to the carrier's SMSC via a short message peer-to-peer protocol (SMPP). SMPP is a telecommunications industry protocol for exchanging SMS messages between SMS peer entities such as short message service centers (SMSC). This protocol is well know in the art and does not require additional disclosure herein. Other protocols may be used to communicate between the service provider system 102 and the carrier's SMSC. The SMS Gateway 218 supports both sending and receiving SMS messages and converts the SMS messages to/from the internal platform message format.

The WLIM gateway 212 connects the service provider system 102 to the WINDOWS LIVE bridging gateway. The WLIM gateway 212 is responsible for sending and receiving SMS messages from WINDOWS LIVE as well as receiving presence information from the WINDOWS LIVE cloud 34. In one embodiment, the WLIM gateway 212 interface to the WINDOWS LIVE bridging gateway is based on a Simple IP (SIP) protocol. Other protocols may be used.

The web gateway 214 relays message to services located on the Internet. The web gateway 214 essentially allows web-hosted services to provide mobile services through the platform 102. The SIP gateway 216 is responsible for handling SIP messages for Voice Over Internet Protocol (VoIP) traffic. The ABCH gateway 210 is the bridge between WINDOWS LIVE Address Book and the service provider system address book. The B&R gateway 208 connects the address book in the service provider system 102 to the carrier's backup and restore server (e.g., a server that is responsible to backup the contacts of the mobile handsets).

Other gateways may include, by way of example only, an ID gateway (not shown) that is responsible for ID Federation. In one embodiment, an ID gateway exposes web services for performing authentication and contains a user interface for collecting a username and password. The ID gateway may also provide sign-in tokens based on the authentication done by the Directory Service 202. Another gateway may include an MMS gateway (also not shown). This gateway connects the service provider system 102 to the carrier's MMSC using the MM7 protocol. It supports both sending and receiving MMS messages and converts them to/from the internal service provider platform message format.

Figure 3:
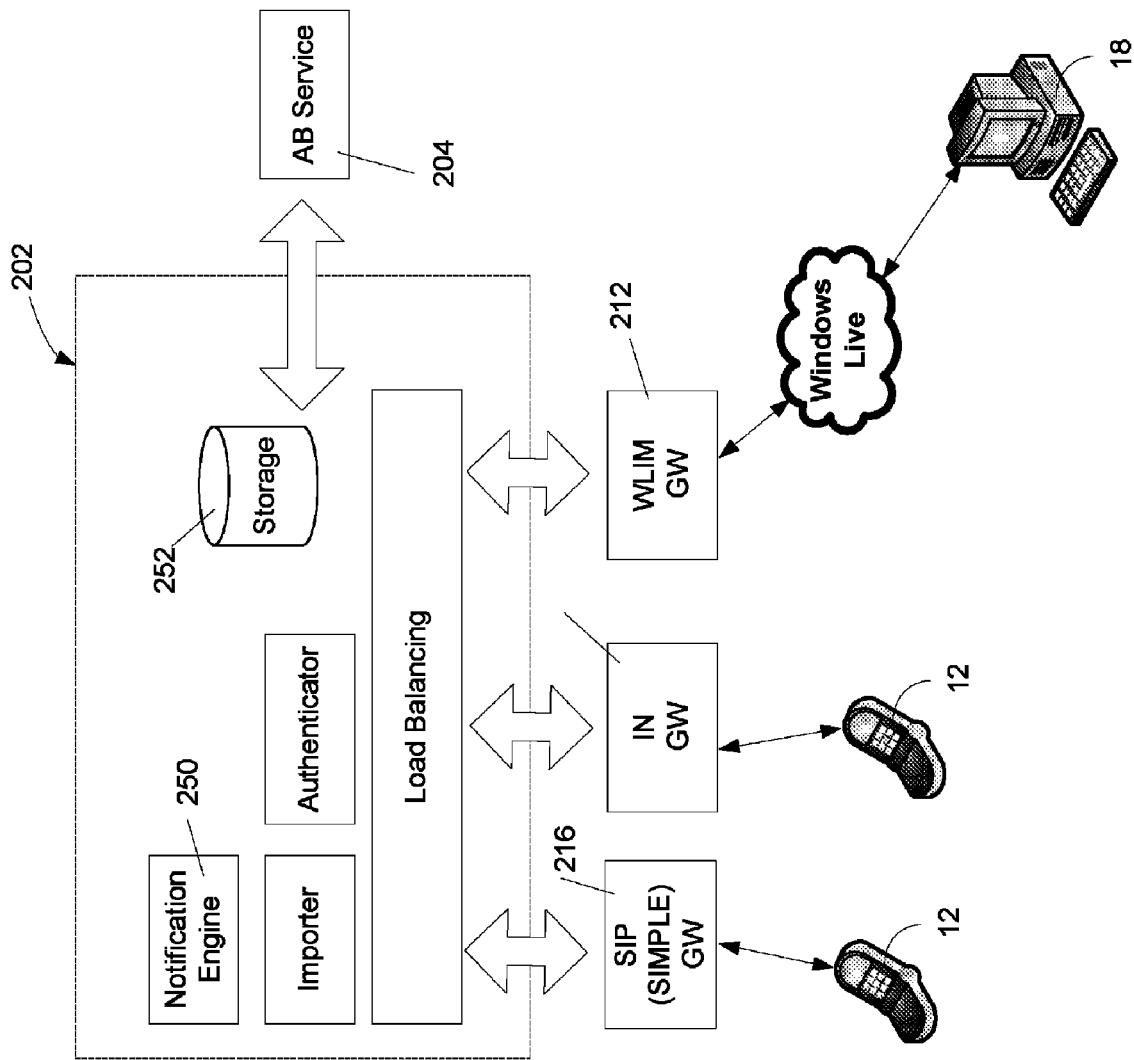
FIG. 3 depicts a block diagram of an embodiment of the directory service shown in FIG. 2.

FIG. 3 illustrates an embodiment of the directory service 202. The directory service 202 manages each user's contact information; including the user's rich multiple sub-identities. All mobile devices that belong to a user are registered and the user's meta-data and profile information are stored in the storage unit 252. Other services, applications and user's clients can search and manipulate (according to their level of authorization) the database of the subscribers.

The directory service 202 offers a centralized store service to subscribers of the service provider system 102. The directory service 202 stores both structured data (searchable, sortable data) and non-structural data. Structured data includes, by way of example only, the user's name, age, gender, email address, and the like. Non-structural data includes data that may not be searched such as, by way of example only, photographs and annotations the user added to personal information stored in the directory service 202. The directory service 202 may also store the various device capabilities for each mobile device used by the user. Many users communicate to others via more than one mobile device. A user may call or text message someone on their cellular phone. The user may also communicate with other friends by email and instant messaging via a computer.

In one embodiment, every user that subscribes to the directory service 202 is assigned a unique identification (ID). Even though each user is assigned a single unique ID, the user may have multiple identities stored within the directory service 202. Identities may include a user's WINDOWS LIVE ID, Social community identities (e.g., Facebook ID, Myspace ID, etc.).

The address book database 112 is managed by the address book service 204. The database 112 is a converged address book (also referred to as a "network address book") managed by the telecommunications operator. A network address book comprises a unified contacts list that can be accessed from any application/end-point that requires contacts. For example, the network address book may be accessed by a mobile/fixed phone, instant message client, email client, social community service (e.g., Facebook®, LinkedIn®, etc.), and the like. The address book service 204 synchronizes address book changes and propagates the changes to the different end points, regardless of where the changes were made. As a result, the subscriber will see the same address book regardless of what device the user views the address book from.

If the user has an address book on his mobile phone and an address book in his WINDOWS LIVE application, the database 112 stores a unified contact list that comprises a combination of the contact information from the mobile phone and the WINDOWS LIVE application. The address book service 204 periodically synchronizes the two address books with the contact information stored in the database 112.

The messaging service 206 delivers messages between the various components of the system. The messaging service 206 contains a routing policy engine which controls the destination of the messages.

The address book service 204 includes a database server (not shown) that manages the unified address book 112 for all registered users, including contact information. This contact information is available to registered users across a variety of user application programs, such as cellular phones, emails, instant messaging, etc. The unified address book may include profiles for each registered user, as explained in greater detail hereinafter.

Figure 4:
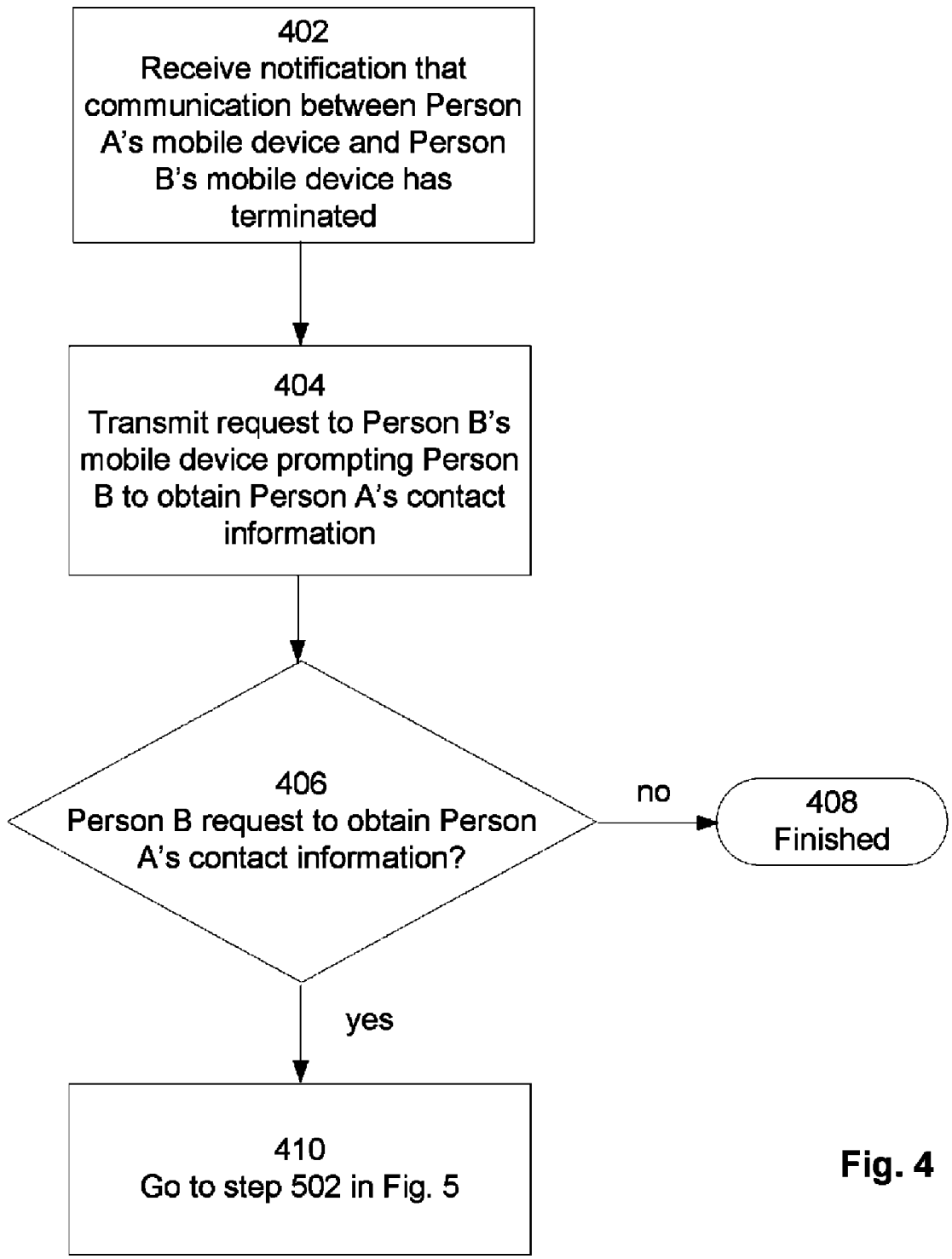
FIG. 4 depicts a flow diagram providing exemplary steps for prompting a user to obtain third party contact information.

FIG. 4 illustrates exemplary steps for prompting a user to obtain contact information. For the purpose of describing this technology only, a first user ("caller"), using mobile device 10 ("calling mobile device"), calls a second user on their mobile device 12 ("receiving mobile device"). In step 402, a notification is received that the communication between the calling mobile device and the receiving mobile device has terminated. In step 404, a request is transmitted to the receiving mobile device 12. The request invites the second user to obtain the caller's contact information. In one embodiment, the request is displayed in the screen of the receiving mobile device 12. The display prompts the second person to push a first button to obtain the caller's contact information and press a second button to decline the request. If the second person declines the request, the method 400 is finished, in step 408. If the second person selects the second button, the service provider system 102 receives the request from the receiving mobile device, in step 502 (see FIG. 5).

Figure 5:
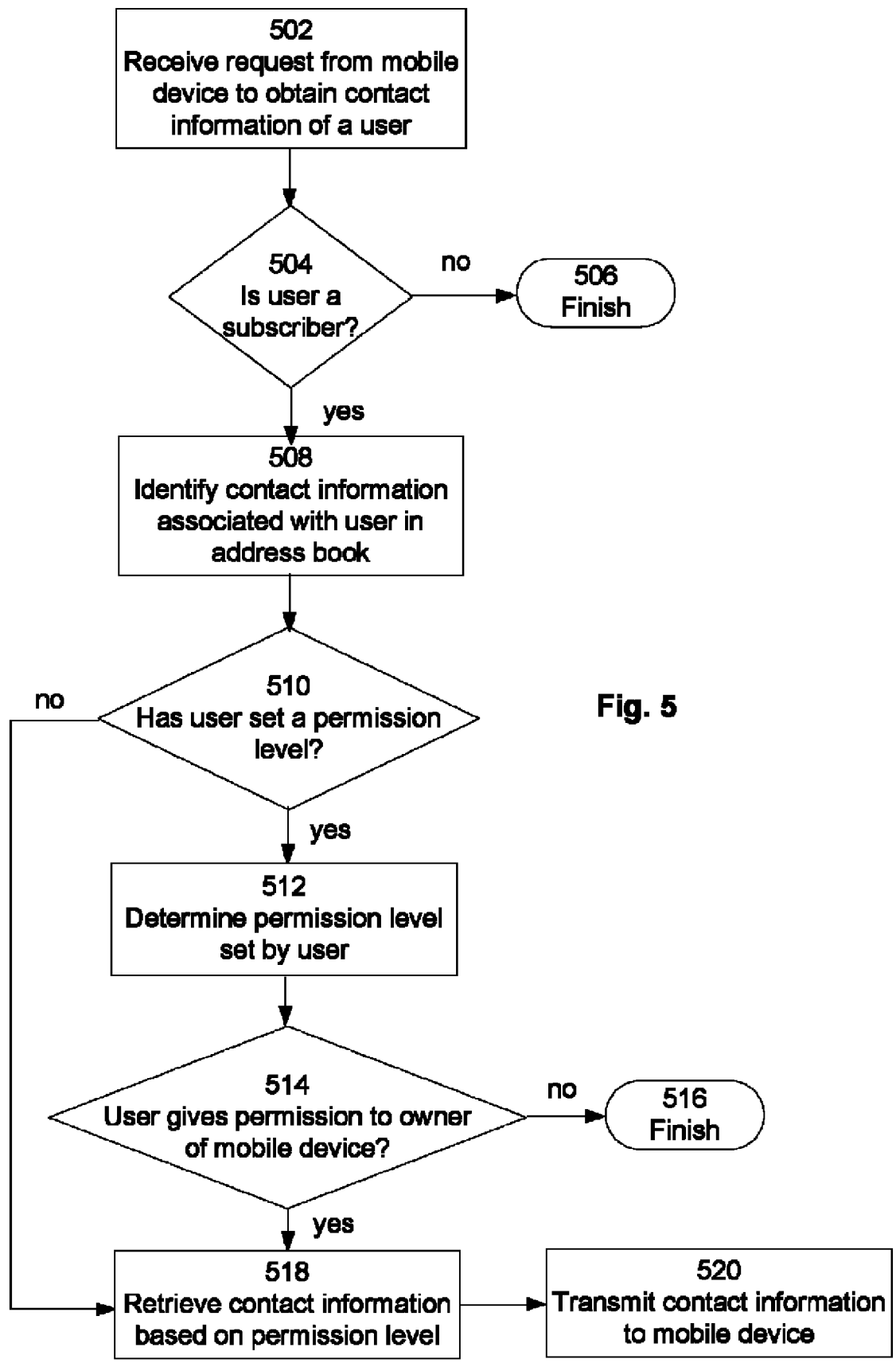
FIG. 5 depicts a flow diagram providing exemplary steps of transmitting third party contact information to a mobile device.

Referring now to FIG. 5, once the service provider system 102 receives the request from the receiving mobile device, the system 102 locates the caller's contact information. The request transmitted from the receiving mobile device may be made at any time such as, but not limited to, during the telephone conversation or after the conversation has ended. A user may also transmit a request for another person's contact information at any time. For example, two people may meet and introduce themselves to each other, but not exchange any contact information. Afterwards, one of the people may want to obtain the contact information of the other. They may type in the person's name in their mobile device and transmit a request for that person's contact information to the service provider system 102 at any time.

In step 504, it is determined whether the caller is a subscriber of the service provider system 102. The service provider system 102 only stores and maintains address books for subscribers. If the caller is not a subscriber, an "unavailable" message is transmitted to the receiving mobile device, in step 506.

If the caller is a subscriber, the caller's contact information stored in the address book is identified, in step 508. The service provider system 102 includes a lookup mechanism used to provide reverse lookups for users (e.g., search users by phone number, etc.). The caller's contact information may be identified using any number of identifiers. Identification data can be, but is not limited to, a unique identification number generated by the service provider system 102, a mobile communication device phone number (referred herein as "cell phone number"), an electronic serial number (ESN), a mobile identification number (MIN) or a system identification code (SID).

In step 510, a permission level set by the caller, if any, is detected. If the caller has set a permission level, the permission level is identified, in step 512. As discussed in more detail later, the caller may set a permission level for some or all of the caller's contact information stored in the database 112.

The permissions allow a user to designate who has permission to view the user's contact information, and which information within the address book they have permission to view. In one embodiment, the fields within a given sub-profile are not independently permissioned, but instead the sub-profile receives a set permission for the entire sub-profile. It is understood that the individual fields within a sub-profile may be independently permissioned in alternative embodiments.

A user may set permissions on an individual by individual basis, or the user may group individuals into permission groups so that the set permissions apply to anyone in the group or thereafter added to the group. Known groups for which permissions may be set include the public in general, friends, friends of friends, Messenger Contacts, individuals, etc. The different groups, and those who are admitted into the different groups, may be defined by the user via the profile manager 110. Only those groups and/or individuals who have been granted permission by the user to view a particular sub-profile will be able to access and view that sub-profile.

In step 514, it is determined whether the person requesting to view the caller's contact information has permission and if so, which contact information the requester has permission to view. If the requestor does not have permission to obtain any of the caller's contact information, an "unavailable" message is displayed in the screen of the receiving mobile device, in step 516.

In step 518, the caller's contact information that the requestor has permission to view is retrieved. This may include public contact information, private information that the requester has permission to view, and any combination of the two. More detail regarding how the contact information is identified and retrieved in provided later.

In step 520, the contact information is transmitted to the receiving mobile device. The contact information may be transmitted to the receiving mobile device in the form of a virtual card (vCard), SMS message, or any other format known within the art. In one embodiment, the contact information transmitted to the receiving mobile device is automatically stored in the mobile device's local address book. In another embodiment, the contact information is not stored in the mobile device's local address book until the user accepts the contact information. For example, the mobile device, upon receiving the contact information, may require the user to confirm to save the contact information by displaying a message such as "Do you want to save contact information?" on the screen. The user must select a button or key on the mobile device to download the contact information.

Figure 6:
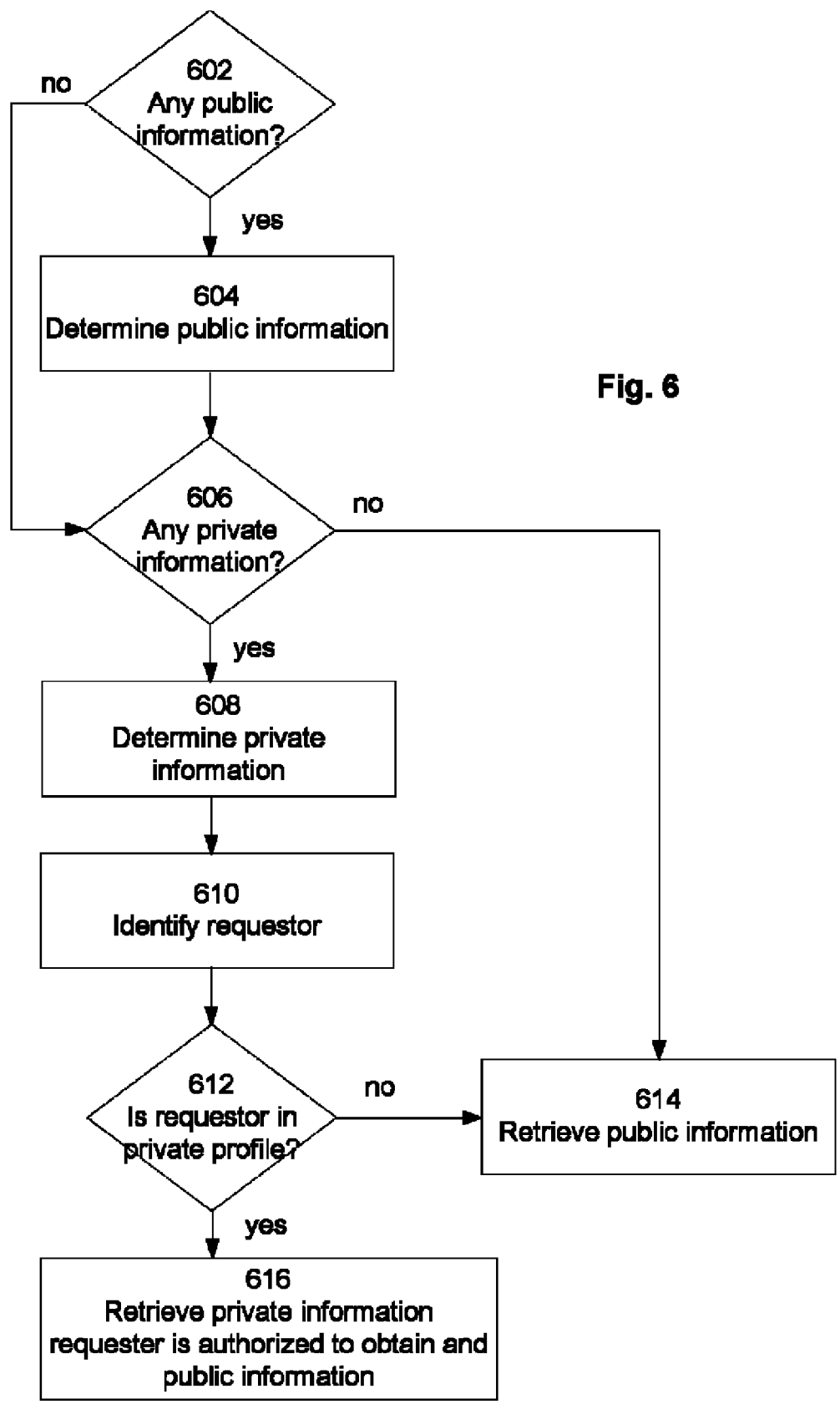
FIG. 6 depicts a flow diagram illustrating exemplary steps of retrieving third party contact information for transmission in FIG. 5.

FIG. 6 illustrates exemplary steps for determining which contact information can be viewed or obtained by another person (step 518 in FIG. 5). At this point, the caller has been identified. The caller's contact information will now be interrogated to determine which contact information is public, which contact information is private, and which private contact information the requestor has permission to view or obtain. In step 602, it is determined whether any of the caller's contact information comprises public information. Public information comprises contact information that the user has designated that anyone can obtain or view (see FIG. 9B). If some of the caller's contact information is designated public information, the public contact information is identified, in step 604.

Figure 9A:
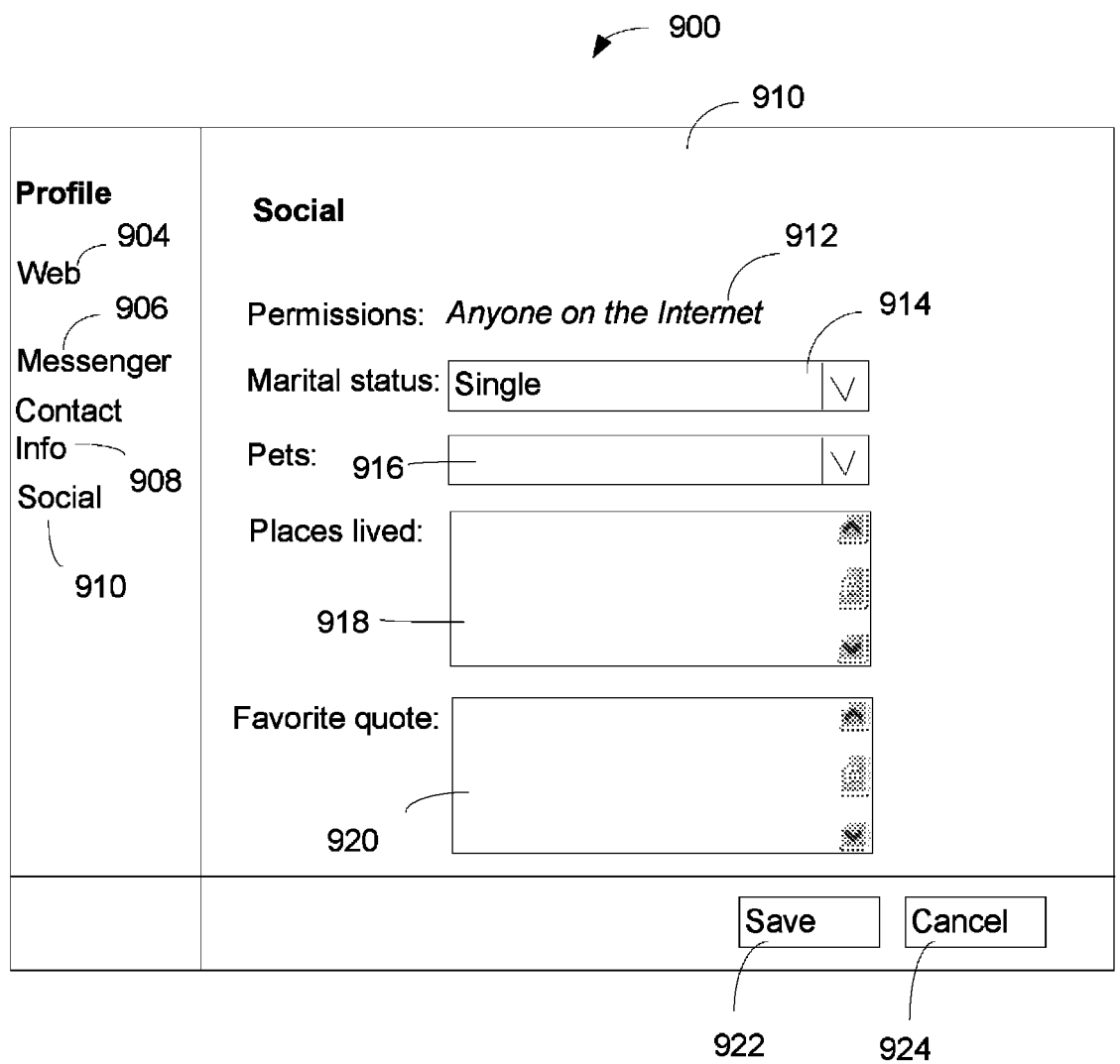
FIG. 9A depicts an embodiment of a user interface for entering contact information.
Figure 9B:
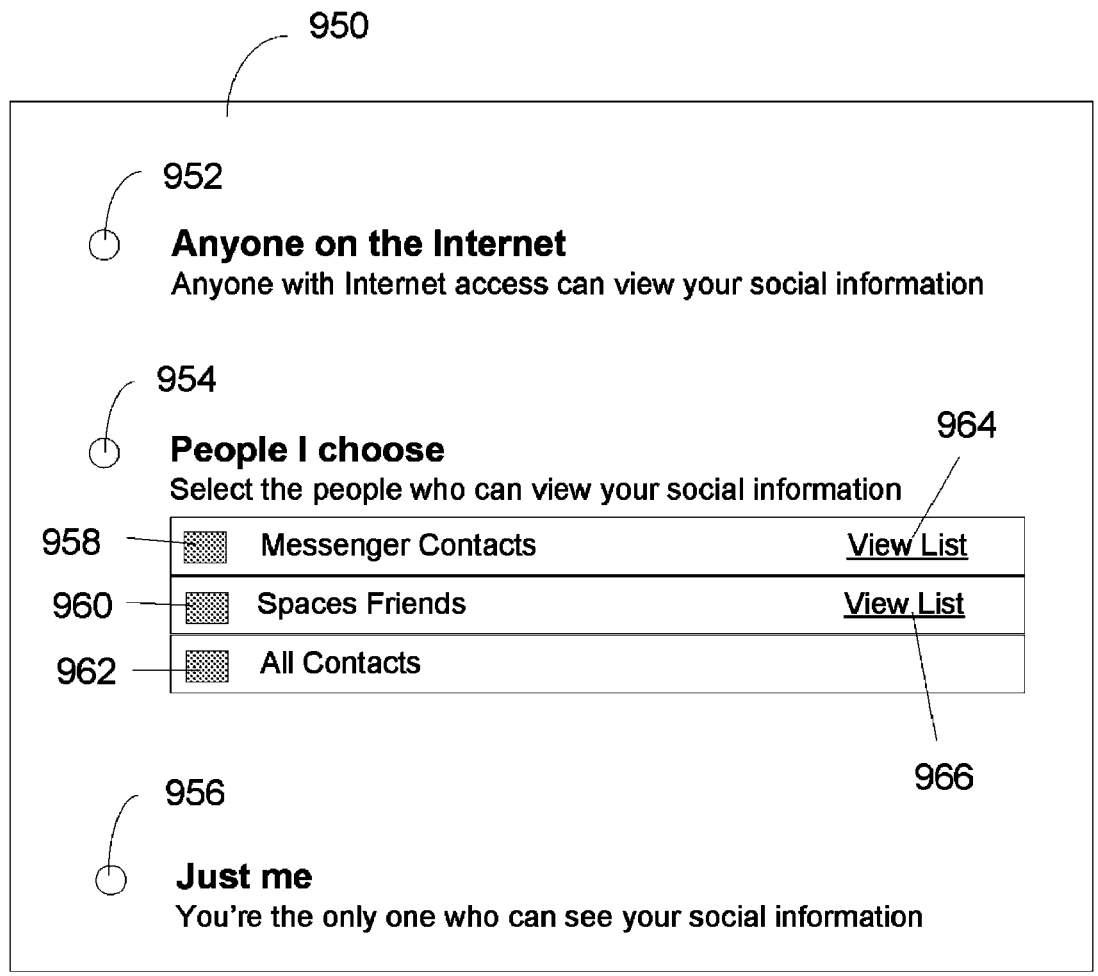
FIG. 9B depicts an embodiment of a user interface for controlling access of contact information.

In step 606, it is determined whether any of caller's contact information is designated private. FIGS. 9A-9B provide additional detail regarding designating portions of contact information private. If the caller's contact information contains some private information, the private contact information is identified, in step 608.

In step 610, the person requesting the contact information (also referred to as the "requestor") is identified. The requester may be identified by identification data such as, but is not limited to, a unique identification number generated by the service provider system 102, a mobile communication device phone number (referred herein as "cell phone number"), an electronic serial number (ESN), or a mobile identification number (MIN).

In step 612, it is determined whether the requester has permission to view any of the caller's private contact information. The permission level set by the caller is interrogated to determine if the identification data associated with the requester is included. For example, the service provider system 102 determines whether the requester is identified in any of the permission groups set up by the caller (e.g., "friend" group or "co-worker" group). If the requester cannot be identified in step 612, the requester is assigned a default profile which, in one embodiment, only allows the requester to obtain public contact information.

If the requestor does not have permission to view any of the caller's private contact information, the caller's public contact information is retrieved (if any is available), in step 614. If the requester has permission to view the caller's private contact information, in step 612, the caller's private contact information is retrieved based on the requestor's permission level, in step 616. The caller's public contact information is also retrieved in step 616.

Figure 7:
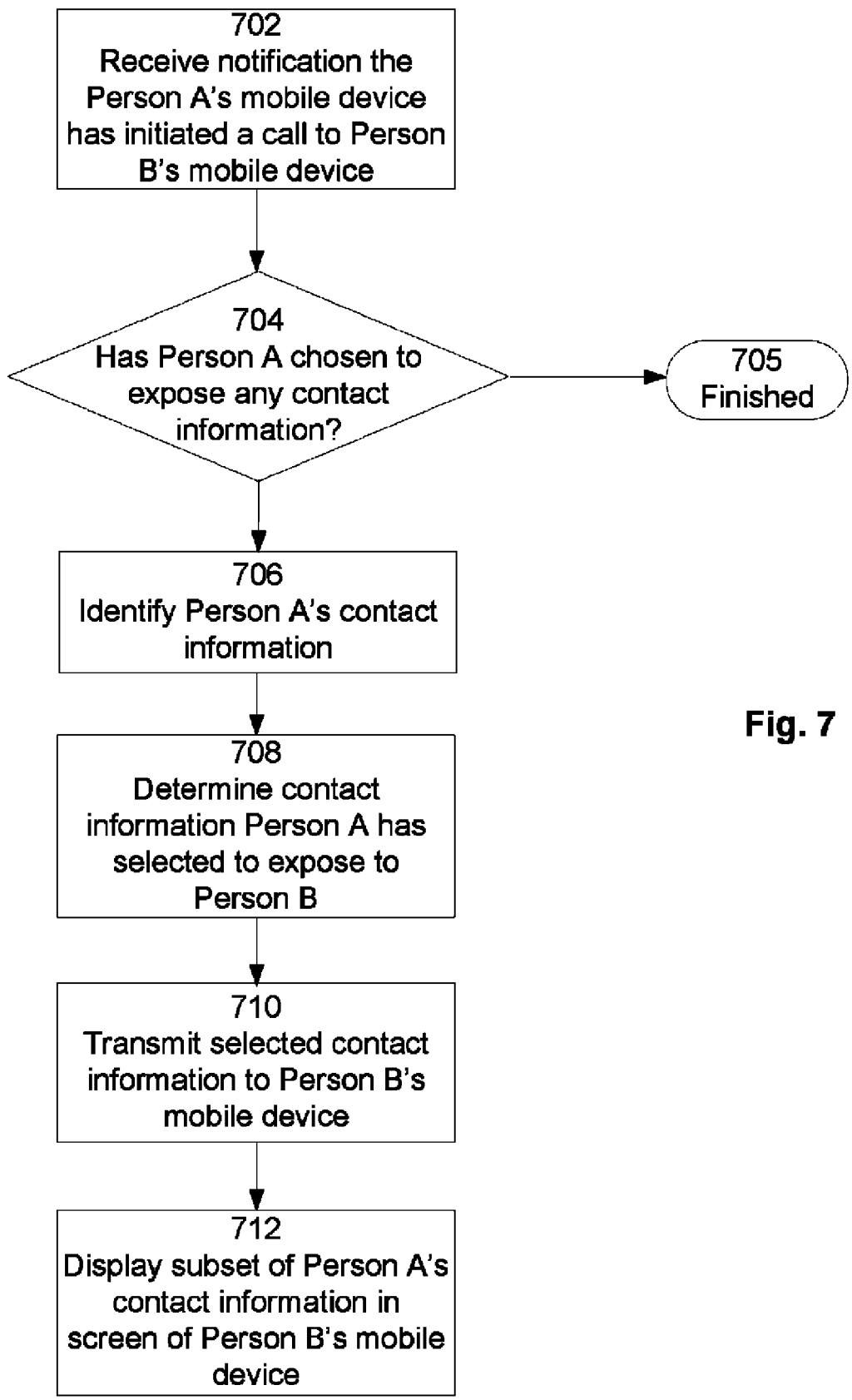
FIG. 7 depicts a flow diagram providing exemplary steps for providing a caller identification feature.

FIG. 7 illustrates a flow diagram of exemplary steps for providing a caller-identification feature. In a conventional mobile phone system, if the receiving mobile device does not have the caller's phone number stored in the mobile device's address book, the screen of the receiving mobile device would display the message "unknown" (or a similar message). Many people will not answer their phone when the caller is not identified. To avoid this situation, the service provider system 102 displays a subset of the caller's contact information in the screen of the receiving mobile device as if the device contained the caller's phone number. For the purpose of describing this technology only, the caller is calling someone in their "buddies" list (defined in WINDOWS MESSENGER), and the caller has set his profile to display his nickname when calling such persons.

In step 702, notification that the caller has initiated a phone call is received. In step 704, it is determined whether the caller has chosen to expose any contact information to the person they are calling. If the caller has chosen not to expose any contact information to the person being called, the caller-identification feature is completed, in step 705. If the caller has chosen to expose contact information, the caller's contact information is identified, in step 706. The caller may be identified by identification data such as, but is not limited to, a unique identification number generated by the service provider system 102, a mobile communication device phone number (referred herein as "cell phone number"), an electronic serial number (ESN), or a mobile identification number (MIN).

In step 708, the contact information the caller has chosen to expose is identified. As discussed above, the contact information exposed to another is based on the permission level set by the caller. In step 710, a subset of the caller's contact information is transmitted to the receiving mobile device. The caller may want to be identified to others in different ways. For example, the caller may only want to expose their name and phone number when calling a co-worker. On the other hand, if the caller is calling a friend, the caller may want to expose more personal information such as, but not limited to, a nickname, a photograph, or a social community ID. In the context of a phone call, the service provider system 102 interrogates whether the dialed phone number is associated with a friend, a co-worker, etc. In the example above whereby the person being called is a friend, the subset of contact information transmitted to the receiving mobile device may comprise any personal information (e.g., nickname, photograph, etc.). It is within the scope of the technology for the caller to designate which contact information will be transmitted to the receiving mobile device for the caller-identification feature.

In step 714, the subset of the caller's contact information is displayed the screen of the receiving mobile device. Displaying the caller's name, nickname, etc. in the screen of the receiving mobile device, even though the receiving mobile device does not have the caller's contact information stored in it, functions as a caller-identification feature. With this feature, the person receiving the phone call can identify the caller and is more likely to answer the call.

Figure 8:
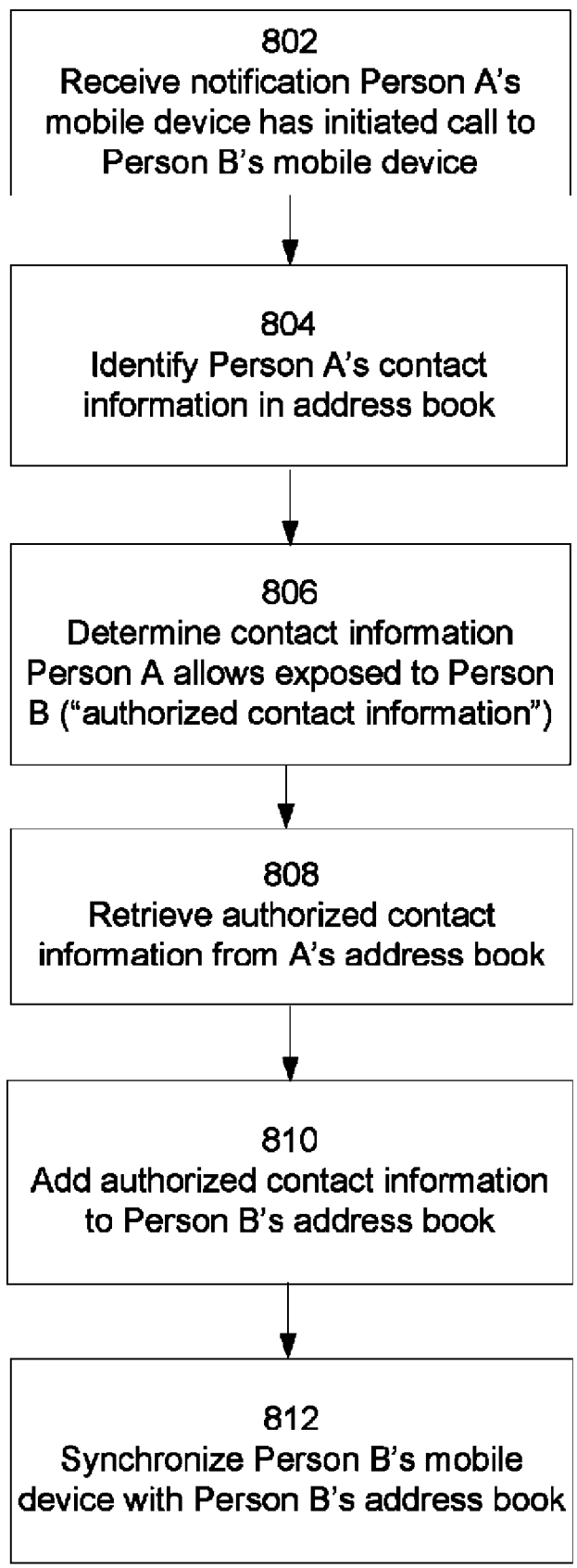
FIG. 8 depicts a flow diagram providing exemplary steps for synchronizing a mobile device with a network address book.

FIG. 8 illustrates a flow diagram providing exemplary steps for synchronizing a mobile device with an address book. In step 802, the service provider system 102 receives notification that a sending mobile device has initiated a telephone call to a receiving mobile device. The sending mobile device and receiving mobile device may comprise any device such as, but not limited to, a cellular phone, a PDA, a laptop computer, a personal computer, or an IP phone. For the purpose of describing this technology, Alice owns the sending mobile device and Bob owns the receiving mobile device and both Alice and Bob have an address book being managed by the service provider system 102.

In step 804, Alice's address book is located. Alice's address book may be located by identification data associated with Alice such as, but is not limited to, a unique identification number generated by the service provider system 102, the mobile device phone number, an electronic serial number (ESN), or a mobile identification number (MIN).

In step 806, Alice's contact information that Bob is allowed to view is identified. As described above, Alice may set permission levels controlling which contact information may be viewed by others. Using the example provided above, Bob is initially identified by the telephone number Alice typed into her mobile device. Alice's address book is interrogated for Bob's telephone number to determine if the telephone number is located within, for example, Alice's "friends" group, Alice's "work" group or not located at all in Alice's address book.

In step 808, the Alice's contact information is retrieves based on the permission level associated with Bob's telephone number. If Bob's telephone number is associated with Alice's "work" group, only Alice's name and telephone number is retrieved. If Bob's telephone number is associated with Alice's "friends" group, all of Alice's contact information is retrieved. If Bob's telephone number cannot be located at all, only the contact information that Alice has designated "public" is retrieved (e.g., name and telephone number). The particular contact information available to each person is customized by Alice.

In step 810, the contact information retrieved from Alice's address book is added to Bob's address book. In step 812, Bob's mobile device is synchronized with his address book. Thus, Alice's contact information is downloaded onto at least one of Bob's mobile devices. Before downloading Alice's contact information onto one of Bob's mobile devices, the capabilities of Bob's mobile device are determined. If the mobile device is, for example, a personal computer, any of Alice's contact information added to Bob's address book may be downloaded onto the personal computer because a personal computer can store large files. If, on the other hand, the mobile device is a cellular phone, not all cellular phones may store, for example, a photograph and have limited memory. In this case, only a subset of Alice's contact information that was added to Bob's address book is downloaded onto the mobile device. All of Alice's contact information added to Bob's address book may be viewed by the cellular phone.

FIGS. 9A-9B illustrate an exemplary user interface for setting permission profiles. The user interface 900 is a profile interface that allows a user to enter personal information that tells others about the user. The user controls which personal information is shared and who gets to view it. By way of example only, the user interface 900 includes a web profile page 904, a messenger profile page 906, a contact information page 908 and a social profile page 910.

FIG. 9A illustrates the social profile page 910. The page 910 allows the user to enter information that includes, but is not limited to, marital status, pet names, places lived and favorite quote. The marital status drop-down menu 914 allows the user to select marital status, which is shown in FIG. 9 as "single." The pets drop-down menu 916 allows the user to indicate the type of pets owned. The places lived text window 918 allows the user to indicate where they live now and lived previously, including any comments, favorite neighborhood stores, address and so on. The favorite quote text window 920 allows the user to share a favorite quote. Sharing this information with others is controlled by the permissions designation 912. FIG. 9 illustrates that the user will allow "Anyone on the Internet" to view their social information (referred to herein as "publicly available" contact information). The user can also limit who can view this social information.

FIG. 9B illustrates a user interface 950 for controlling access to the user's social information entered in the user interface 900 (shown in FIG. 9A). The user interface 950 allows the user to choose between three permission levels. The user may click on the button 952 to designate the social information included in the social user interface 900 as publicly available information. The user may click on the button 954 to choose who can view the social information included in the user interface 900. The user may also click on the button 956 to prevent others from viewing the social information included in the social user interface 900.

Selecting the button 954 allows the user to designate specific persons who may view the social information in the user interface 900. FIG. 9B illustrates that the user may limit access to the social information to only messenger contacts by selecting the button 958, limit access to the social information to only spaces friends by selecting the button 960 or allow access to the social information by anyone in the user's contact list by selecting the button 962. The user may select all three buttons 958, 960 and 962. If the user selects either the button 958 or button 960, the user may view their current list of contacts by selecting the "View List" link 964 or view the current list of friends by selecting the "View List" link 966. By selecting either link 964 or 966, the user can control who may view their social information, person by person.

Figure 10:
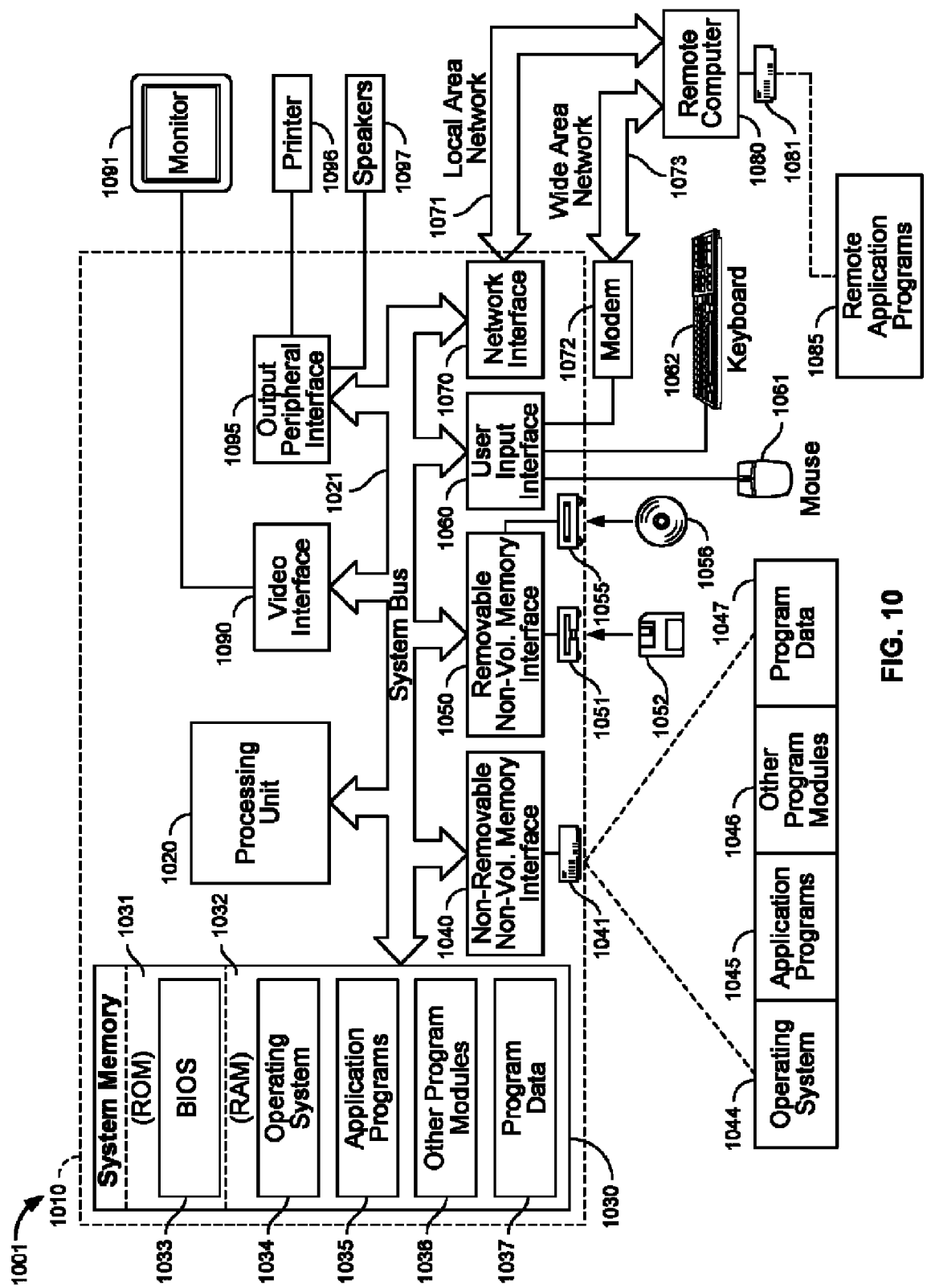
FIG. 10 depicts a block diagram of a computer system for performing the methods described herein.

With reference to FIG. 10, an exemplary system for implementing the inventive system includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 may include a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disc drive 1041 that reads from or writes to non-removable, nonvolatile magnetic media and a magnetic disc drive 1051 that reads from or writes to a removable, nonvolatile magnetic disc 1052. Computer 1010 may further include an optical media reading device 1055 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disc drive 1041 is illustrated as storing operating system 1044, application programs 1045, other program modules 1046, and program data 1047. These components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and a pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local window network (LAN) 1071 and a wide window network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for transmitting contact information associated with a first person to a mobile device of a second person, comprising:
   (a) receiving notification that a communication originated from a mobile device of the first person to the mobile device of the second person has ended;
   (b) automatically transmitting a first request to the mobile device of the second person responsive to receiving the notification, the first request prompting the second person to obtain the contact information associated with the first person; and
   (c) when the second person transmits a second request to obtain the contact information in response to the first request transmitted in step (b),
      (i) obtaining the contact information associated with the first person from a network address book; and
      (ii) transmitting the contact information from the network address book to the mobile device of the second person.

2. The method as recited in claim 1, wherein the step (c)(ii) of transmitting the contact information to the mobile device of the second person comprises transmitting the contact information via a messaging service.

3. The method as recited in claim 1, wherein the step (c)(ii) of transmitting the contact information to the mobile device of the second person comprises transmitting a virtual card to the mobile device of the second person.

4. The method as recited in claim 3, wherein the step (c)(ii) of transmitting the contact information to the mobile device of the second person comprises pushing the virtual card to the mobile device of the second person.

5. The method as recited in claim 1, wherein the step (c)(ii) of transmitting the contact information to the mobile device of the second person comprises transmitting the contact information to one of the following devices: a mobile phone, a personal digital assistant, and a personal computer.

6. The method as recited in claim 1, wherein the step (c)(ii) of transmitting the contact information to the mobile device of the second person comprises sending an instant message to the mobile device of the second person.

7. The method as recited in claim 1, wherein the step (c)(i) of obtaining the contact information associated with the first person from a network address book comprises:
   identifying the contact information associated with the first person based on a unique identification associated with the mobile device of the first person;
   determining what contact information associated with the first person that the first person has authorized to expose to the second person according to a permission level set by the first person; and
   obtaining the exposed contact information from the network address book.

8. The method as recited in claim 7, wherein the unique identification associated with the mobile device includes one of the following: a cell phone number, an electronic serial number, a mobile identification number, a system identification code.

9. The method as recited in claim 1, further including:
(d) storing the transmitted contact information associated with the first person on the mobile device of the second person.

* * * * *